(12) United States Patent
Campbell et al.

(10) Patent No.: US 11,876,423 B2
(45) Date of Patent: Jan. 16, 2024

(54) TWO-PIECE END TURN WINDING SUPPORT

(71) Applicant: Hamilton Sundstrand Corporation, Charlotte, NC (US)

(72) Inventors: Kris H. Campbell, Poplar Grove, IL (US); Skyler Ripplinger, Rockford, IL (US); Brian C. Konopa, Rockford, IL (US); Kanthi Gnanam Kannan, Katy, TX (US); Edward C. Allen, Davis, IL (US); Hamming Lin, Weldon Spring, MO (US); Luis E. Anker, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 68 days.

(21) Appl. No.: 17/519,265

(22) Filed: Nov. 4, 2021

(65) Prior Publication Data
US 2023/0134351 A1  May 4, 2023

(51) Int. Cl.
*H02K 3/28* (2006.01)
*H02K 3/51* (2006.01)
*H02K 3/52* (2006.01)

(52) U.S. Cl.
CPC .............. *H02K 3/51* (2013.01); *H02K 3/28* (2013.01); *H02K 3/527* (2013.01)

(58) Field of Classification Search
CPC ............. H02K 3/51; H02K 3/28; H02K 3/527
See application file for complete search history.

(56) References Cited

U.S. PATENT DOCUMENTS

| 5,666,016 A | 9/1997 | Cooper |
| 6,727,634 B2 | 4/2004 | Tornquist et al. |
| 6,753,633 B1 | 6/2004 | Eberle |
| 2013/0221794 A1* | 8/2013 | Ponnampalam ......... H02K 3/38 72/55 |
| 2016/0211713 A1* | 7/2016 | Patel ....................... H02K 3/30 |
| 2016/0380501 A1* | 12/2016 | Koenig ................... H02K 3/38 29/598 |

FOREIGN PATENT DOCUMENTS

| FR | 2998112 A | 5/2014 |
| JP | S56132139 A | 10/1981 |
| WO | 2016078933 A2 | 5/2016 |

OTHER PUBLICATIONS

WO2016078933A2 English translation (Year: 2023).*
FR2998112A1 English translation (Year: 2023).*
Search Report issued in European Patent Application No. 22204560.1; Application Filing Date Oct. 28, 2022; dated Apr. 3, 2023 (8 pages).

* cited by examiner

*Primary Examiner* — Christopher M Koehler
*Assistant Examiner* — Viswanathan Subramanian
(74) *Attorney, Agent, or Firm* — CANTOR COLBURN LLP

(57) ABSTRACT

An end winding support of a rotor of an electric machine is provided. The end winding support includes a first part and a second part. The first part includes an elongate body about which a conductive winding is wound. The elongate body has a surface defining a first groove. The second part is attached to the first part. The second part includes a body which extends outwardly from the elongate body and which has a surface defining a second groove corresponding to the first groove.

15 Claims, 3 Drawing Sheets

TWO-PIECE END TURN WINDING SUPPORT

BACKGROUND

The present disclosure relates to electric machines and, more particularly, to an electric motor-generator with a two-piece end turn winding support.

A typical electric machine includes a rotor and a stator surrounding the rotor with an air gap defined between an outer diameter of the rotor and an inner diameter of the stator. The rotor can include radially outwardly extending teeth with one or more conductive windings wound thereon. The stator can include a set of permanent magnets or electro-magnets disposed about the rotor. When current is applied to the conductive windings, the current generates a flux field that interacts with the permanent magnets or the electro-magnets of the stator to cause the rotor to rotate about a rotational axis thereof. Alternatively for an electric generator, rotation interacts with the field and produces a current.

As the conductive windings are wound on the teeth of the rotor, the conductive windings can be provided with end turns at axial ends of the rotor. The end turns allow the conductive windings to be repeatedly wound back and forth on the rotor. End winding supports can be provided to support the end turns.

It has been found that with some configurations, the end winding supports experience unacceptably high levels of stress and that this stress can lead to fractures in some cases. While material strength of the end winding supports can be increased, this is either an expensive solution or results in end winding supports that do not meet the functional requirement that they be electrically non-conductive.

BRIEF DESCRIPTION

According to an aspect of the disclosure, an end winding support of a rotor of an electric machine is provided. The end winding support includes a first part and a second part. The first part includes an elongate body about which a conductive winding is wound. The elongate body has a surface defining a first groove. The second part is attached to the first part. The second part includes a body which extends outwardly from the elongate body and which has a surface defining a second groove corresponding to the first groove.

In accordance with additional or alternative embodiments, the second part extends beyond an outboard portion of the first part.

In accordance with additional or alternative embodiments, the second part further includes a curved radially outwardly facing surface.

In accordance with additional or alternative embodiments, the second part is press-fit to the first part.

In accordance with additional or alternative embodiments, the first groove widens around a recess into a widened section at an inboard portion of the first part.

In accordance with additional or alternative embodiments, the widened section of the first groove is receptive of a busbar and the recess is engaged with a fastening element to secure the busbar in the widened section of the first groove.

In accordance with additional or alternative embodiments, a fitting is interposable between the fastening element and an interior surface of the recess.

According to an aspect of the disclosure, a rotor of an electric machine is provided. The rotor includes a rotor assembly having multiple poles, a conductive winding, which is wound around one or more of the multiple poles and an end winding support to support the conductive winding. The end winding support includes a first part and a second part. The first part includes an elongate body about which the conductive winding is wound. The elongate body has a surface defining a first groove. The second part is attached to the first part. The second part includes a body which extends outwardly from the elongate body and which has a surface defining a second groove corresponding to the first groove.

In accordance with additional or alternative embodiments, a containment band is disposed radially about the rotor assembly and in abutment with the second part.

In accordance with additional or alternative embodiments, the second part extends outwardly beyond an outboard portion of the first part in circumferential and axial directions of the rotor assembly.

In accordance with additional or alternative embodiments, the second part further includes a curved radially outwardly facing surface.

In accordance with additional or alternative embodiments, the second part is press-fit to the first part.

In accordance with additional or alternative embodiments, the first groove widens around a recess into a widened section at an inboard portion of the first part.

In accordance with additional or alternative embodiments, a busbar, is configured to be seated within the widened section of the first groove and a fastening element is engageable with the recess to secure the busbar in the widened section of the first groove.

In accordance with additional or alternative embodiments, a fitting is interposable between the fastening element and an interior surface of the recess.

In accordance with additional or alternative embodiments, the first and second grooves cooperatively provide space between the conductive winding and the first and second parts, respectively.

According to an aspect of the disclosure, a rotor assembly method is provided and includes installing a first part of a winding support in a rotor assembly, winding a conductive winding about the first part or around a pole of the rotor assembly with the first part used to take up slack in the conductive winding and attaching a second part to the first part, the second part extending outwardly from the first part.

In accordance with additional or alternative embodiments, the method further includes winding the conductive winding about one or more of multiple poles of the rotor assembly.

In accordance with additional or alternative embodiments, the attaching includes press-fitting the second part to the first part.

In accordance with additional or alternative embodiments, the method further includes arranging a containment band about the rotor assembly and in abutment with the second part.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, end winding supports are provided for use in electric machines to support conductive windings on rotors. The end winding supports are each split into two parts along a line where end winding support fracturing is likely to occur. As a result, stress or strain that is otherwise experienced by conventional end winding supports is not transmitted to either of the two parts in the same way and failure can be avoided.

Figure 1:
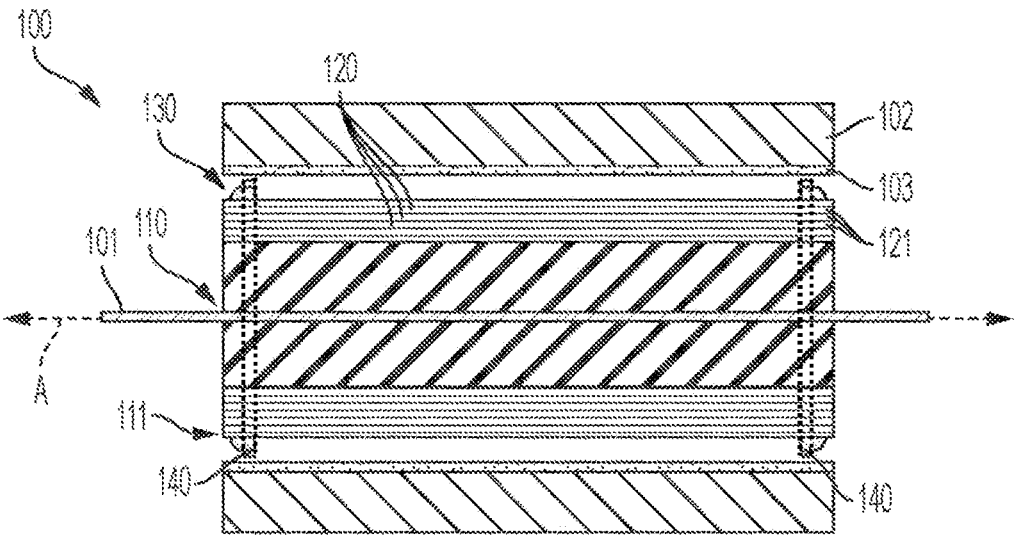
FIG. 1 is a schematic side section view of an electric machine in accordance with embodiments.
Figure 2:
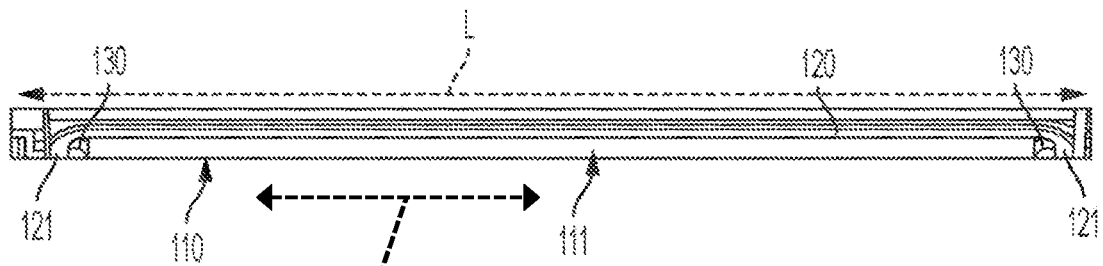
FIG. 2 is a radially inward view of a portion of a rotor assembly of an electric machine including end winding supports in accordance with embodiments.

With reference to FIGS. 1 and 2, a rotor 101 of an electric machine 100 is provided. As shown in FIGS. 1 and 2, the electric machine 100 includes the rotor 101, which is rotatable about a rotational axis A thereof and a stator 102. The stator 102 surrounds the rotor 101 and includes permanent- or electro-magnets 103. The rotor 101 includes a rotor assembly 110 having multiple poles 111, conductive windings 120, each of which is wound around one or more of the multiple poles 111 and end winding supports 130. The conductive windings 120 can be preformed. Each of the end winding supports 130 can be located at or near to one of the multiple poles 111 at either end of the rotor assembly 110 and is configured to support a corresponding end turn 121 of a corresponding one of the conductive windings 120. During an operation of the electric machine 100, current is applied to the conductive windings 120 and causes the rotor 101 to either rotate about the rotational axis A by interactions with a flux field generated by the permanent- or electro-magnets 103 or if rotating already to generate current in the electro-magnets of stator 102.

The rotor 101 can further include containment bands 140. The containment bands 140 are disposed radially about the rotor assembly 110 and can be provided with tabs 141 (see FIG. 3) that are disposed in abutment with a curved radially outwardly facing surface 131 (see FIG. 3) of each of the end winding supports 130.

Figure 3:
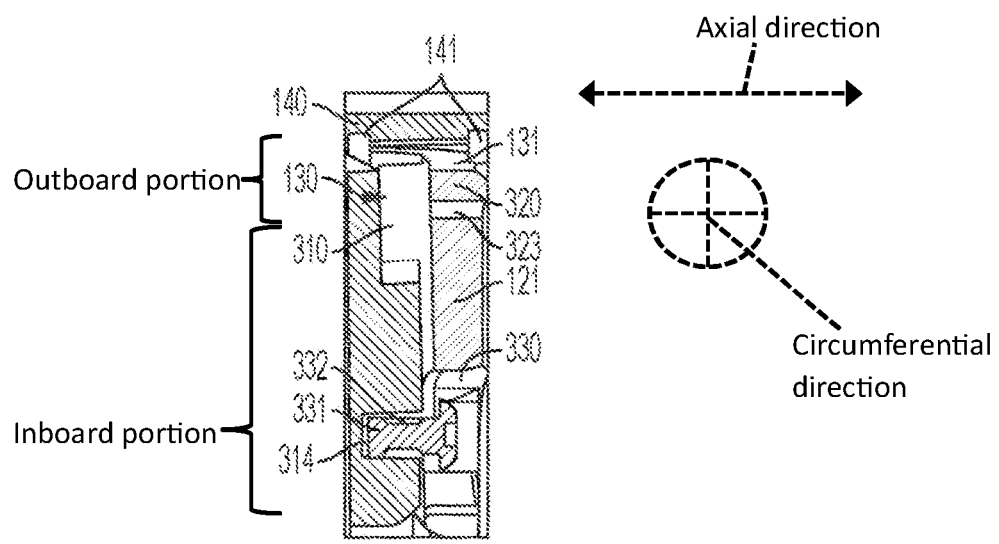
FIG. 3 is an enlarged side section view of a portion of a rotor assembly of an electric machine including an end winding support in accordance with embodiments.
Figure 4:
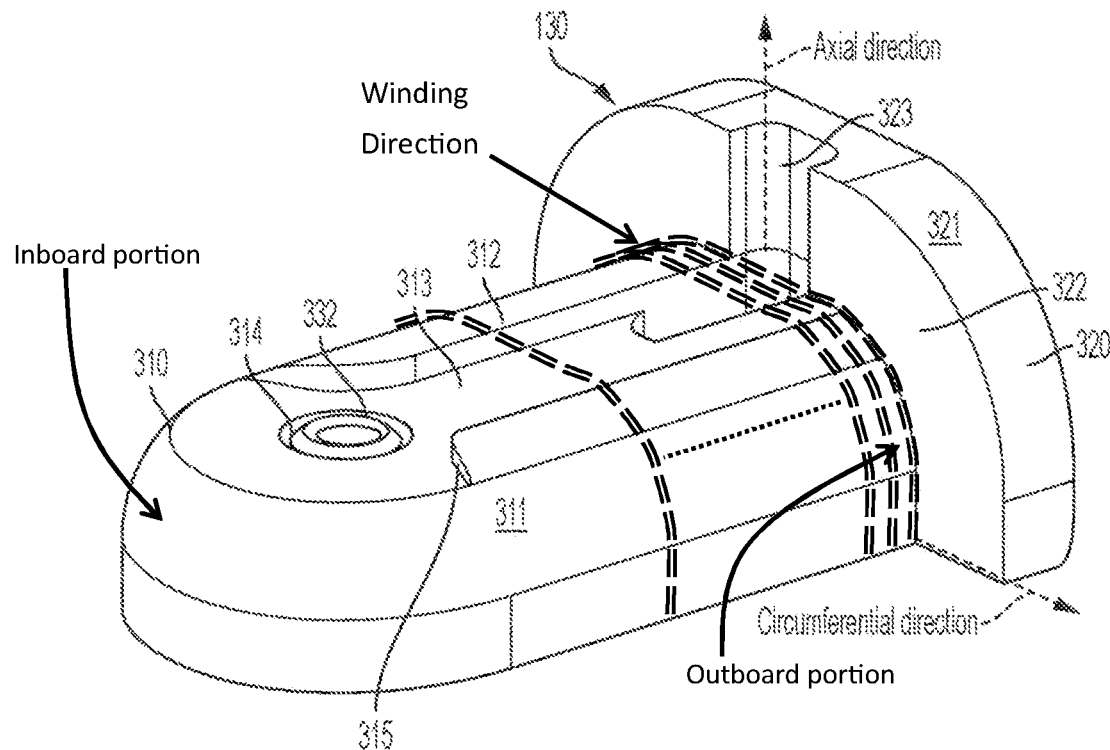
FIG. 4 is a perspective view of an end winding support of FIGS. 3 and 4 in accordance with embodiments.

With continued reference to FIG. 2 and with additional reference to FIGS. 3 and 4, each end winding support 130 includes a first part 310 and a second part 320. The first part 310 includes an elongate body 311 that has a surface 312 formed to define a first groove 313. The second part 320 can be attached or press-fit to the first part 310 and includes a body 321 which extends outwardly from an outboard portion of the elongate body 311 of the first part 310 in circumferential and axial directions of the rotor assembly 110 (see FIG. 4). The second part 320 has a surface 322 formed to define a second groove 323 which corresponds in position to the first groove 313.

When an end winding support 130 is installed in the rotor assembly 110 of FIG. 1 at or near to one of the multiple poles 111, corresponding ones of the conductive windings 120 are stacked radially as shown in FIG. 1 and wound around the end winding support 130 as shown in FIG. 2. More particularly, each conductive winding 120 extends along a longitudinal length L (see FIG. 2) of the rotor assembly 110 and is wound around the first part 310 of the end winding support 130. In accordance with embodiments, the first groove 313 and the second groove 323 are formed and configured to cooperatively create space between each of corresponding ones of the conductive windings 120 and the end winding support 130 for lubricant (e.g., oil) flow and/or for winding connections.

In accordance with embodiments and as shown in FIG. 4, the first groove 313 can be formed to widen around a recess 314 into a widened section 315 at an inboard portion of the elongate body 311 of the first part 310. As shown in FIG. 3, the rotor 101 can also include a busbar 330 configured to be seated within the widened section 315 and a fastening element 331, which is engageable with the recess 314 to secure the busbar 330 in the widened section 315. In addition, the rotor 101 can include a fitting 332, which is interposable between the fastening element 331 and an interior surface of the recess 314.

Figure 5:
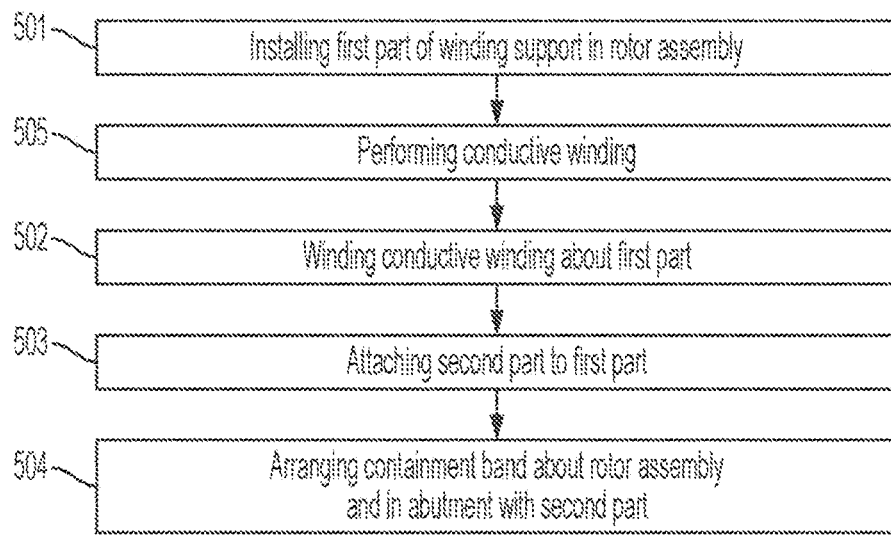
FIG. 5 is a flow diagram illustrating a rotor assembly method in accordance with embodiments.

With reference to FIG. 5, a rotor assembly method is provided for assembling the rotor 101 and the rotor assembly 110 described herein. As shown in FIG. 5, the rotor assembly method includes installing a first part of a winding support in a rotor assembly (501), winding a conductive winding about the first part (502) by, e.g., winding the conductive winding about one or more of multiple poles of the rotor assembly, and attaching a second part to the first part (503) where the second part extends outwardly from an outboard portion of the first part by, e.g., press-fitting the second part to the first part. In accordance with embodiments, the rotor assembly method can further include arranging a containment band about the rotor assembly and in abutment with the second part (504). In accordance with additional embodiments, the rotor assembly method can also include preforming the conductive winding (505) prior to at least the winding of operation 502. In some cases, the preforming can be executed prior to the installing of the first part of operation 501.

Figure 6:
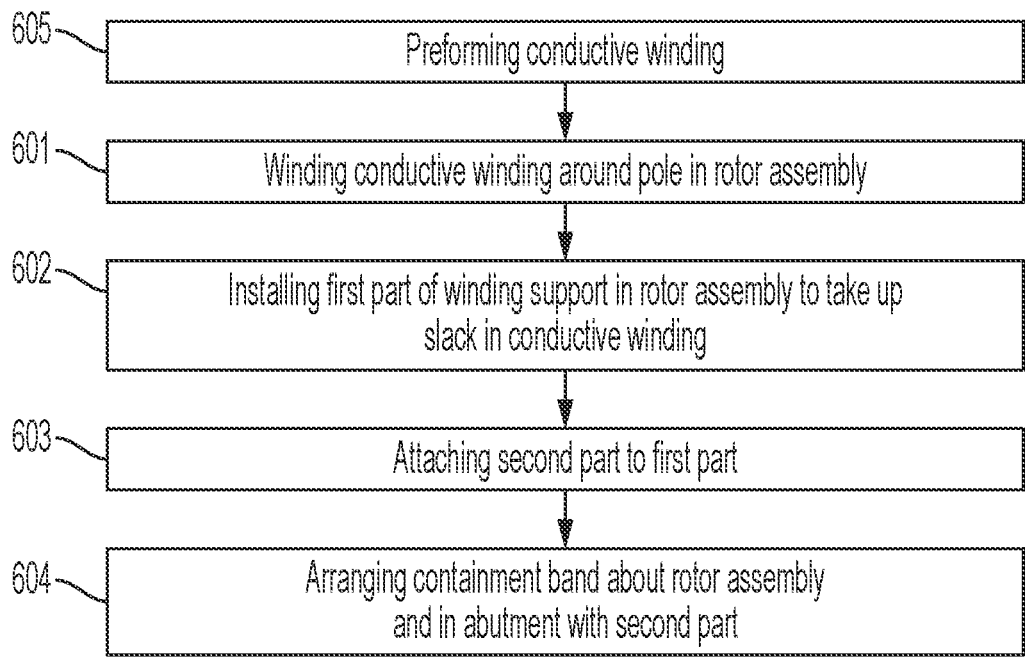
FIG. 6 is a flow diagram illustrating a rotor assembly method in accordance with alternative embodiments.

With reference to FIG. 6, a rotor assembly method is provided for assembling the rotor 101 and the rotor assembly 110 described herein. As shown in FIG. 6, the rotor assembly method includes winding a conductive winding around a pole in a rotor assembly (601), installing a first part of a winding support in the rotor assembly to take up slack in the conductive winding (602) and attaching a second part to the first part (603) where the second part extends outwardly from an outboard portion of the first part by, e.g., press-fitting the second part to the first part. In accordance with embodiments, the rotor assembly method can further include arranging a containment band about the rotor assembly and in abutment with the second part (604). In accordance with additional embodiments, the rotor assembly method can also include preforming the conductive winding (605) prior to the winding of operation 601.

Technical effects and benefits of the present disclosure are the provision of an end winding support of conductive windings of a rotor that is split into two parts and thus resists fracturing. Of these two parts, a first part can be easily installed whereupon the corresponding conductive winding can be more easily placed. Then, the second part can be attached or installed to complete the supporting function and transmit rotating forces to a containment band. As such, a part that would have been more difficult and expensive or prone to failure is provided as a more robust, simple and cost-effective subassembly.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An end winding support of a rotor of an electric machine, the end winding support comprising:
   a first part comprising an elongate body about which a conductive winding is wound, the elongate body having a surface defining a first groove; and
   a second part, which is attached to an outboard portion of the first part,
   the second part comprising a body which extends outwardly from the elongate body and which has a surface defining a second groove corresponding to the first groove,
   wherein the first groove widens around a recess into a widened section at an inboard portion of the first part, which is opposite the outboard portion of the first part, the widened section of the first groove is receptive of a busbar and the recess is engaged with a fastening element to secure the busbar in the widened section of the first groove.

2. The end winding support according to claim 1, wherein the second part extends beyond the outboard portion of the first part.

3. The end winding support according to claim 1, wherein the second part further comprises a curved radially outwardly facing surface.

4. The end winding support according to claim 1, wherein the second part is press-fit to the outboard portion of the first part.

5. The end winding support according to claim 1, wherein a fitting is interposable between the fastening element and an interior surface of the recess.

6. A rotor of an electric machine, the rotor comprising:
   a rotor assembly having multiple poles;
   a conductive winding, which is wound around one or more of the multiple poles; and
   an end winding support to support the conductive winding and comprising:
      a first part comprising an elongate body about which the conductive winding is wound, the elongate body having a surface defining a first groove; and
      a second part, which is attached to an outboard portion of the first part,
      the second part comprising a body which extends outwardly from the elongate body and which has a surface defining a second groove corresponding to the first groove,
      wherein the first groove widens around a recess into a widened section at an inboard portion of the first part, which is opposite the outboard portion of the first part, and the rotor further comprises:
   a busbar, which is configured to be seated within the widened section of the first groove; and
   a fastening element, which is engageable with the recess to secure the busbar in the widened section of the first groove.

7. The rotor according to claim 6, further comprising a containment band disposed radially about the rotor assembly and in abutment with a curved radially outwardly facing surface of the second part.

8. The rotor according to claim 6, wherein the second part extends outwardly beyond the outboard portion of the first part in circumferential and axial directions of the rotor assembly.

9. The rotor according to claim 6, wherein the second part further comprises a curved radially outwardly facing surface.

10. The rotor according to claim 6, wherein the second part is press-fit to the outboard portion of the first part.

11. The rotor according to claim 6, further comprising a fitting which is interposable between the fastening element and an interior surface of the recess.

12. The rotor according to claim 6, wherein the first and second grooves cooperatively provide space between the conductive winding and the first and second parts, respectively.

13. A rotor assembly method, comprising:
   installing a first part of a winding support in a rotor assembly;
   winding a conductive winding about the first part or around a pole of the rotor assembly with the first part used to take up slack in the conductive winding;
   attaching a second part to an outboard portion of the first part, the second part extending outwardly from the first part; and
   arranging a containment band about the rotor assembly and in abutment with a curved radially outwardly facing surface of the second part.

14. The rotor assembly method according to claim 13, further comprising winding the conductive winding about one or more of multiple poles of the rotor assembly.

15. The rotor assembly method according to claim 13, wherein the attaching comprising press-fitting the second part to the outboard portion of the first part.

* * * * *